(12) United States Patent
Reece et al.

(10) Patent No.: US 7,519,808 B2
(45) Date of Patent: Apr. 14, 2009

(54) METHOD AND APPARATUS FOR QUICKLY REANIMATING DEVICES FROM HIBERNATION

(75) Inventors: Dean Reece, Foster City, CA (US); Joseph Sokol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 496 days.

(21) Appl. No.: 11/445,632

(22) Filed: Jun. 2, 2006

(65) Prior Publication Data

US 2007/0250730 A1    Oct. 25, 2007

(51) Int. Cl.
*G06F 15/177* (2006.01)
*G06F 9/24* (2006.01)
*G06F 17/30* (2006.01)

(52) U.S. Cl. .............. 713/2; 713/1; 713/320; 713/321; 713/322; 713/323; 713/324

(58) Field of Classification Search ............ 713/1, 713/2, 320–324
See application file for complete search history.

(56) References Cited

U.S. PATENT DOCUMENTS

| 6,438,668 | B1 | 8/2002 | Esfahani et al. ............. 711/165 |
| 6,609,182 | B1* | 8/2003 | Pedrizetti et al. ............ 711/159 |
| 6,954,852 | B2* | 10/2005 | Burokas et al. ................ 713/2 |
| 7,321,936 | B2* | 1/2008 | Zimmerman et al. ........ 709/231 |
| 7,334,122 | B2* | 2/2008 | Burokas et al. ................ 713/2 |
| 7,376,968 | B2* | 5/2008 | Ritz et al. ..................... 726/17 |
| 2003/0188147 | A1* | 10/2003 | Hsu ................................ 713/1 |
| 2007/0124573 | A1* | 5/2007 | Walker et al. .................. 713/2 |

* cited by examiner

*Primary Examiner*—Abdelmoniem Elamin
(74) *Attorney, Agent, or Firm*—Park, Vaughan & Fleming LLP

(57) ABSTRACT

A system that causes a computing device to enter a hibernation mode. During operation, the system creates a hibernation image for the computing device by identifying processes that do not have visible user interface elements, and generating the hibernation image so that processes with visible user interface elements can be reanimated from the hibernation image first to get the computing device reanimated quickly, while the identified processes are reanimated later. Next, the system stores the hibernation image in non-volatile storage. The system then causes the computing device to enter the hibernation mode, wherein the active state of the computing device is preserved in non-volatile storage while power to volatile storage is turned off.

20 Claims, 5 Drawing Sheets

METHOD AND APPARATUS FOR QUICKLY REANIMATING DEVICES FROM HIBERNATION

RELATED APPLICATION

This application is related to a U.S. patent application, entitled "Method and Apparatus for Facilitating Device Hibernation," by inventors Dean Reece and Simon M. Douglas, having Ser. No. 11/411,363 and a filing date of 25 Apr. 2006.

BACKGROUND

1. Field of the Invention

The present invention relates generally to techniques for saving power in computing devices. More specifically, the present invention relates to a method and an apparatus for quickly recovering from a hibernation mode, wherein the active state of a computing device is preserved while power to the computing device is turned off.

2. Related Art

Power conservation is critically important for many types of computer systems. For example, portable computer systems need to conserve power in order to operate for long periods of time on battery power. Power conservation is also important for computer systems that directly (or indirectly) operate on A/C power to meet the strict power-usage requirements for ENERGY STAR qualification.

Many computer systems save power by entering a power-saving state known as "sleep mode," when they are not busy. During sleep mode, power is saved by placing much of the computer system in a low-power state, while power is maintained to volatile memory. Maintaining power to volatile memory preserves the active state of the computer system and thereby facilitates a nearly instant wake-up process, which provides an excellent user experience.

One drawback of existing sleep systems is that if power is lost during sleep mode, any unsaved work in volatile memory disappears. This loss of power can be easily triggered if a user is distracted for a few hours, or takes too long when performing a sleep-swap of the system battery. Unfortunately, as computer systems begin to incorporate larger amounts of random-access memory (RAM), correspondingly more power is required keep this RAM memory powered up during sleep mode. At the same time, as portable computer systems become progressively thinner and lighter, they contain correspondingly smaller batteries.

As a consequence of these trends, a few years ago, a laptop computer system could be expected to last multiple days in sleep mode, whereas at present, a new laptop computer system can rarely last more than a full day in sleep mode when it is configured with a maximum amount of RAM.

One solution to this problem is to place the computer system into a hibernation mode, wherein the active state of a computing device is preserved while power to the computing device is turned off. Unfortunately, the response time for recovering from hibernation mode when a wakeup event is detected can be long, especially for computer systems configured with a maximum amount of RAM. Note that "response time" refers to the time it takes from the point when the computer system detects a wakeup event to the point the user can interact with the computer system.

Hence, what is needed is a method and an apparatus that enables computer systems to quickly recover from a hibernation mode.

SUMMARY

One embodiment of the present invention provides a system that causes a computing device to enter a hibernation mode. During operation, the system creates a hibernation image for the computing device by identifying processes that do not have visible user interface elements, and generating the hibernation image so that processes with visible user interface elements can be reanimated from the hibernation image first to get the computing device reanimated quickly, while the identified processes are reanimated later. Next, the system stores the hibernation image in non-volatile storage. The system then causes the computing device to enter the hibernation mode, wherein the active state of the computing device is preserved in non-volatile storage while power to volatile storage is turned off.

In a variation of this embodiment, the system reanimates the computing device by first reanimating processes with visible user interface elements from the hibernation image to get the computing device reanimated quickly, and then reanimating the identified processes.

In a variation of this embodiment, while generating the hibernation image, the system evicts user pages for the identified processes into swap space in non-volatile storage, so that the user pages do not have to be part of the hibernation image, and can be swapped back in later as needed after the computing device is reanimated.

In a variation of this embodiment, while generating the hibernation image, the system writes kernel pages and user pages for processes with visible user interface elements to a first portion of the hibernation image, wherein the first portion of the hibernation image is reanimated first. Next, the system writes pages for the identified processes that do not have visible user interface elements to a second portion of the hibernation image, wherein the second portion of the hibernation image is reanimated after the first portion. The system then marks operating system structures to ensure that a system pager does not swap out physical pages allocated to the user pages for the identified processes before the user pages for the identified processes can be restored during the reanimation process.

In a variation of this embodiment, while identifying processes that do not have visible user interface elements, the system identifies processes that do not have visible user interface elements and which have a memory footprint above a threshold size.

In a variation of this embodiment, the processes that do not have visible user interface elements can include processes that are associated with an off-screen session.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs), DVDs (digital versatile discs or digital video discs), and solid state non-volatile storage.

Computing Device

Figure 1:
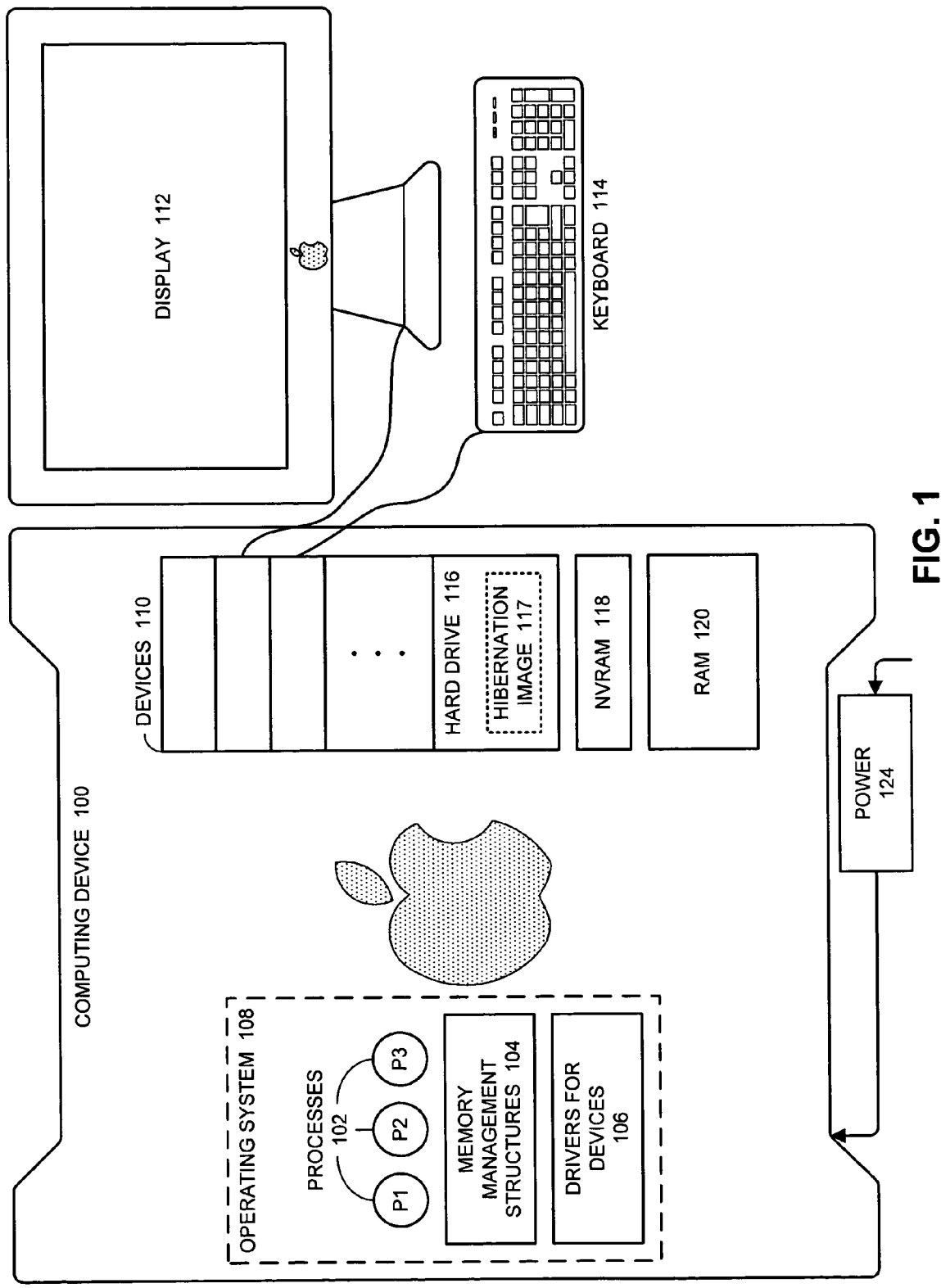
FIG. 1 illustrates a computing device in accordance with an embodiment of the present invention.

FIG. 1 illustrates a computing device 100 in accordance with an embodiment of the present invention. Computing device 100 can generally include any type of computing device or portable-computing device, including, but not limited to, a computing device based on a microprocessor, a mainframe computer, a digital signal processor, a portable computing device, a personal organizer, a device controller, and a computational engine within an appliance.

Computing device 100 includes a number of devices 10, such as a display 112 and a keyboard 114, as well as a hard drive 116. Note that a hibernation image 117 can be stored on hard drive 116 as is described in more detail below.

In additional to these devices 110, computing device 100 includes a random-access memory (RAM) 120, as well as a non-volatile random access memory (NVRAM) 118.

Computing device 100 also includes an operating system 108, which supports the execution of a number of processes 102. Operating system 108 also maintains memory management structures 104, such as page tables, and additionally provides drivers for devices 106.

Note that although the present invention is described in the context of the computing device 100 illustrated in FIG. 1, the present invention can generally operate on any type of computing device that can support a hibernation mode. Hence, the present invention is not limited to the specific computing device 100 illustrated in FIG. 1.

Items in NVRAM

Figure 2:
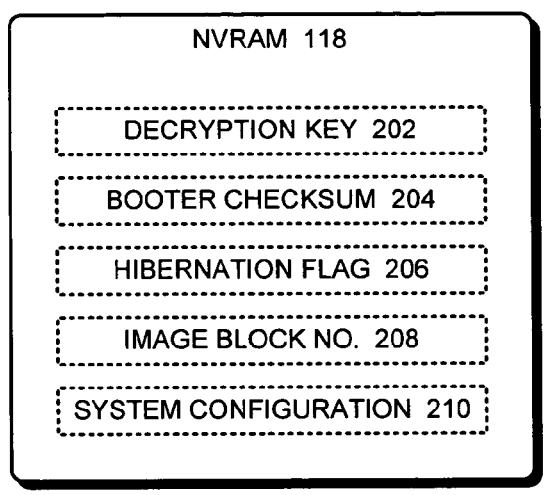
FIG. 2 illustrates items stored in non-volatile random-access memory (NVRAM) in accordance with an embodiment of the present invention.

FIG. 2 illustrates items stored in non-volatile random-access memory (NVRAM) 118 in accordance with an embodiment of the present invention. NVRAM 118 is ideally tamper-proof so that the contents of NVRAM 118 will disappear if NVRAM 118 is removed from computing device 110.

As is illustrated in FIG. 2, NVRAM 118 stores a number of items, including: decryption key 202, booter checksum 204, hibernation flag 206, image block number 208, and system configuration information 210. These items are used to support device hibernation as is described in more detail below with reference to FIGS. 4-5.

Hibernation Image

Figure 3:
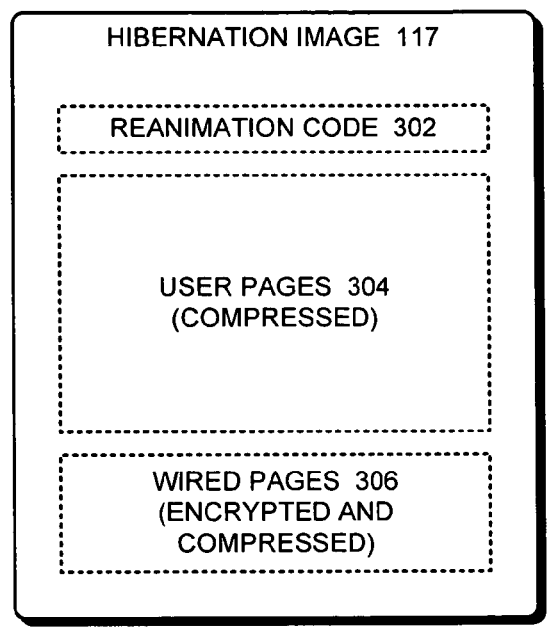
FIG. 3 illustrates the structure of a hibernation image in accordance with an embodiment of the present invention.

FIG. 3 illustrates the structure of hibernation image 117 (from FIG. 1) in accordance with an embodiment of the present invention. Hibernation image 117 includes reanimation code 302, which when executed by computing device 100 performs the operations required to complete the reanimation process. (Note that reanimation code can itself be compressed if the system booter supports decompression operations.)

Hibernation image 117 also contains "user pages" 304, which contain state information for the computing device and are compressed to save space.

Hibernation image 117 additionally contains "wired pages" which are both encrypted and compressed. These wired pages can contain sensitive information, such as passwords, which need to be protected by storing them in encrypted form in the hibernation image 117.

In one embodiment of the present invention, hibernation image 117 is referenced only by block number. To facilitate this block-based referencing, hibernation image 117 contains within itself a linked list of blocks in the image. This block-based referencing enables the booter to read the image from within a block device without having any knowledge of the file system format of the block device.

Process of Generating a Hibernation Image

Figure 4:
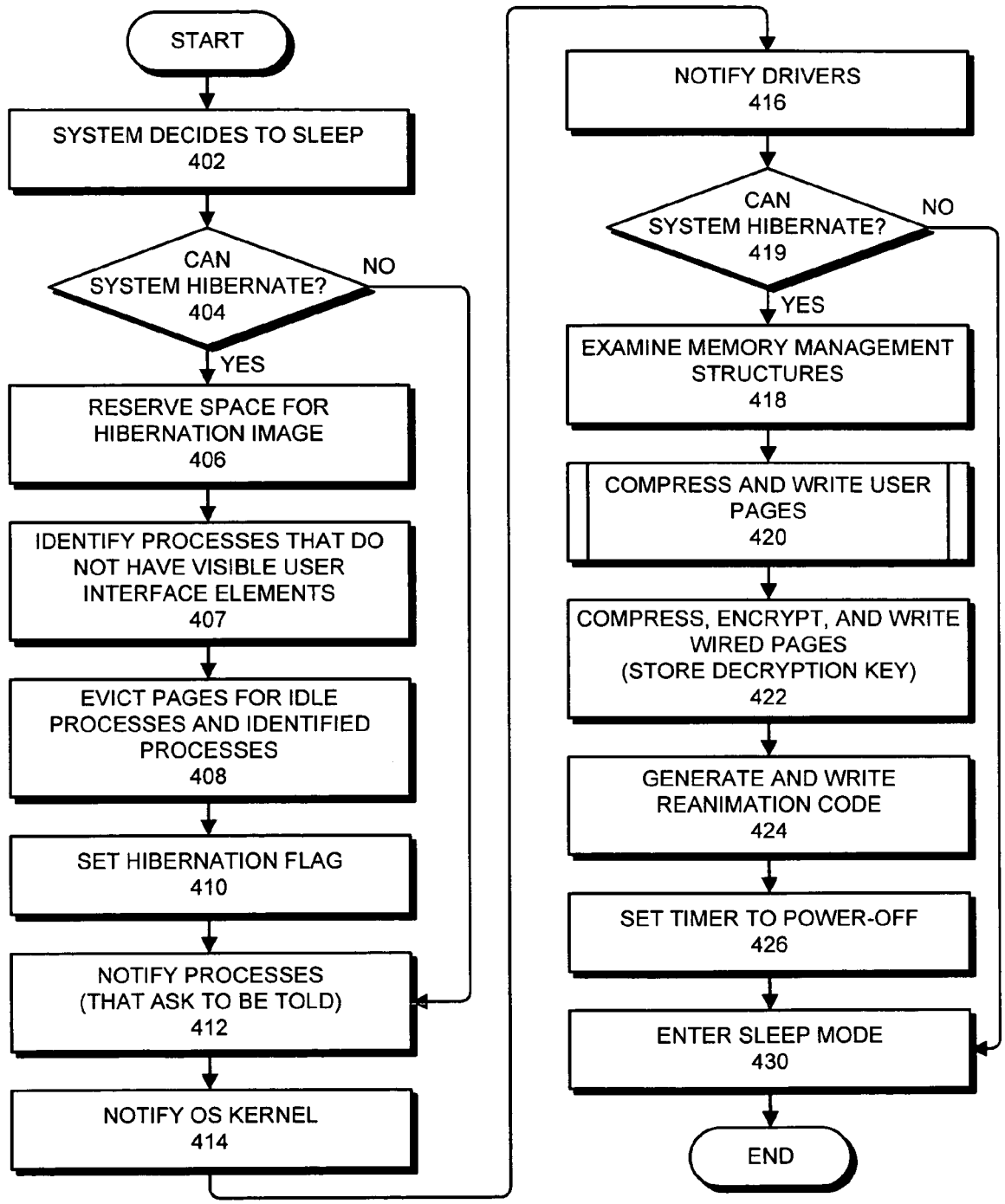
FIG. 4 presents a flow chart illustrating the process of generating a hibernation image while entering sleep mode in accordance with an embodiment of the present invention.

FIG. 4 presents a flow chart illustrating the process of generating a hibernation image while entering sleep mode in accordance with an embodiment of the present invention. The process starts when the system decides to sleep (step 402). This can occur automatically, for example if the system is in idle or is low on power. It can also be initiated by an explicit command from a user.

In order to enter sleep mode, the system first determines whether the system is capable of hibernating (step 404). This can involve looking at preset system configuration parameters. If the system is not capable of hibernating, the system defaults to the normal sleep path, which involves proceeding directly to step 412.

On the other hand, if the system is capable of hibernating, the system performs a number of operations in preparation for hibernation. In particular, the system reserves space on disk for the hibernation image (step 406). The system then identifies processes that do not have visible user interface elements (step 407) and which have a memory footprint above a threshold size. In one embodiment of the present invention, processes that do not have visible user interface elements include processes that are associated with an off-screen session.

The system can also evict pages for idle processes and the identified processes from memory (step 408). This reduces the number of pages that need to be stored in the hibernation image. Furthermore, this allows the system to first reanimate processes with visible user interface elements quickly to get the computing device reanimated quickly. The system then sets a hibernation flag (step 410). This hibernation flag indicates that a hibernation image has been created so that when the system subsequently boots up, the system will reanimate itself from the hibernation image, instead of performing a normal boot up operation.

The system next enters the normal sleep path to perform a number of operations. In particular, the system notifies processes that have asked to be informed that the system is entering a sleep mode (step 412). The system also notifies the operating system kernel that the system is entering sleep mode (step 414). The system can also notify various drivers that the system is entering sleep mode (step 416). Note that if the system is capable of hibernation, the disk driver does not spin the disk down, but instead keeps the disk spinning to prepare for a subsequent hibernation image write operation.

Next, the system again determines whether the system is capable of hibernating (step 419). If not, the system directly enters sleep mode (step 430).

Otherwise, if the system is capable of hibernating, the system enters a "hibernation-polled mode" in which the system prepares for hibernation. This involves examining memory management structures (step 418) and marking pages in memory as either having to be written to disk or not having to be written to disk. Note that pages that are already available on disk, such as pages containing application code or pages that can be reconstructed from other information on disk are marked as not having to be written to disk. Whereas, other pages containing modified data are marked as having to be written to disk.

Next, the system compresses and writes user pages to disk (step 420). The system also encrypts and writes "wired pages" to disk (step 422). Recall that these wired pages may contain sensitive information, such as passwords, so it is desirable to encrypt them before they are stored on disk. The system also stores a corresponding decryption key, which can be used to decrypt to the encrypted pages, to NVRAM.

Figure 6:
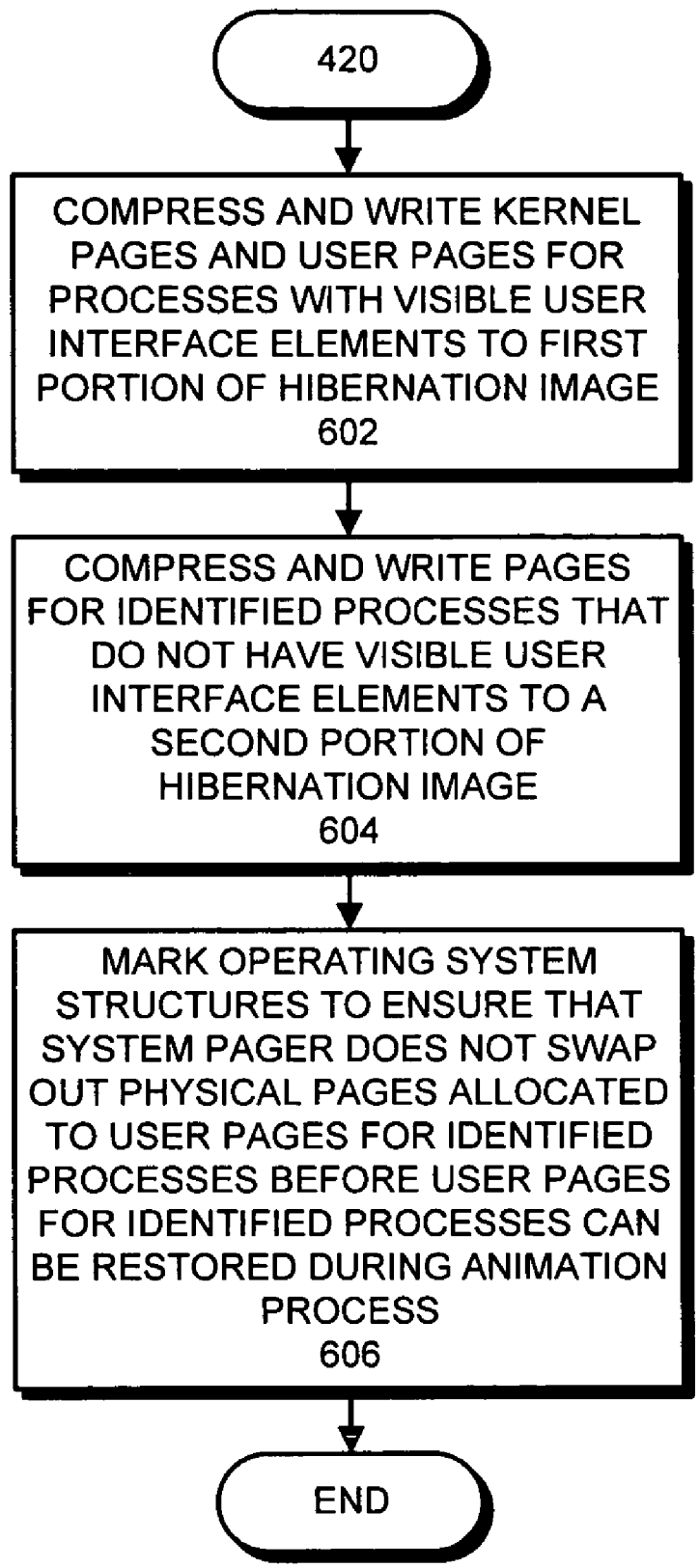
FIG. 6 presents a flow chart illustrating the process of compressing and writing pages for processes to a hibernation image in accordance with an embodiment of the present invention.

FIG. 6 presents a flow chart illustrating the process of compressing and writing pages for processes to a hibernation image in accordance with an embodiment of the present invention. The process begins when the system compresses and writes kernel pages and user pages for processes with visible user interface elements to a first portion of the hibernation image, wherein the first portion of the hibernation image is reanimated first (step 602). Next, the system compresses and writes pages for the identified processes that do not have visible user interface elements to a second portion of the hibernation image, wherein the second portion of the hibernation image is reanimated after the first portion (step 604). The system then marks operating system structures to ensure that a system pager does not swap out physical pages allocated to the user pages for the identified processes before the user pages for the identified processes are restored during the reanimation process (step 606). Note that the pages for the identified processes are reloaded into the same physical locations in memory that they occupied prior to the time the computing device entered hibernation mode.

Finally, returning to FIG. 4, the system generates and writes reanimation code to disk (step 424). This reanimation code can be subsequently used to reanimate the hibernation image.

Next, the system can optionally set a timer which indicates the time when the system will subsequently enter hibernation mode (step 426). Finally, the system enters sleep mode (step 430), wherein power to the system is reduced, but power is maintained to volatile memory. If the system remains in sleep mode until the timer expires, the system will enter hibernation mode, wherein power to volatile storage is turned off. Note that by creating the hibernation image while the computing device is entering the sleep mode, the system can subsequently enter the hibernation mode from the sleep mode without having to generate the hibernation image. This is a significant advantage because when the system ultimately decides to hibernate there may be very little battery power left to generate a hibernation image. The hibernation operations also involve significant disk activity, which may be surprising to the user if this disk activity occurs at a later time. Furthermore, when waking up to create the hibernation image, the system is not guaranteed to be in a safe operating environment. It could be in the overhead bin on an airline flight, in the trunk of an automobile on a bumpy road, or could be subjected to even worse adverse conditions.

Process of Reanimating a Computing Device from a Hibernation Image

Figure 5:
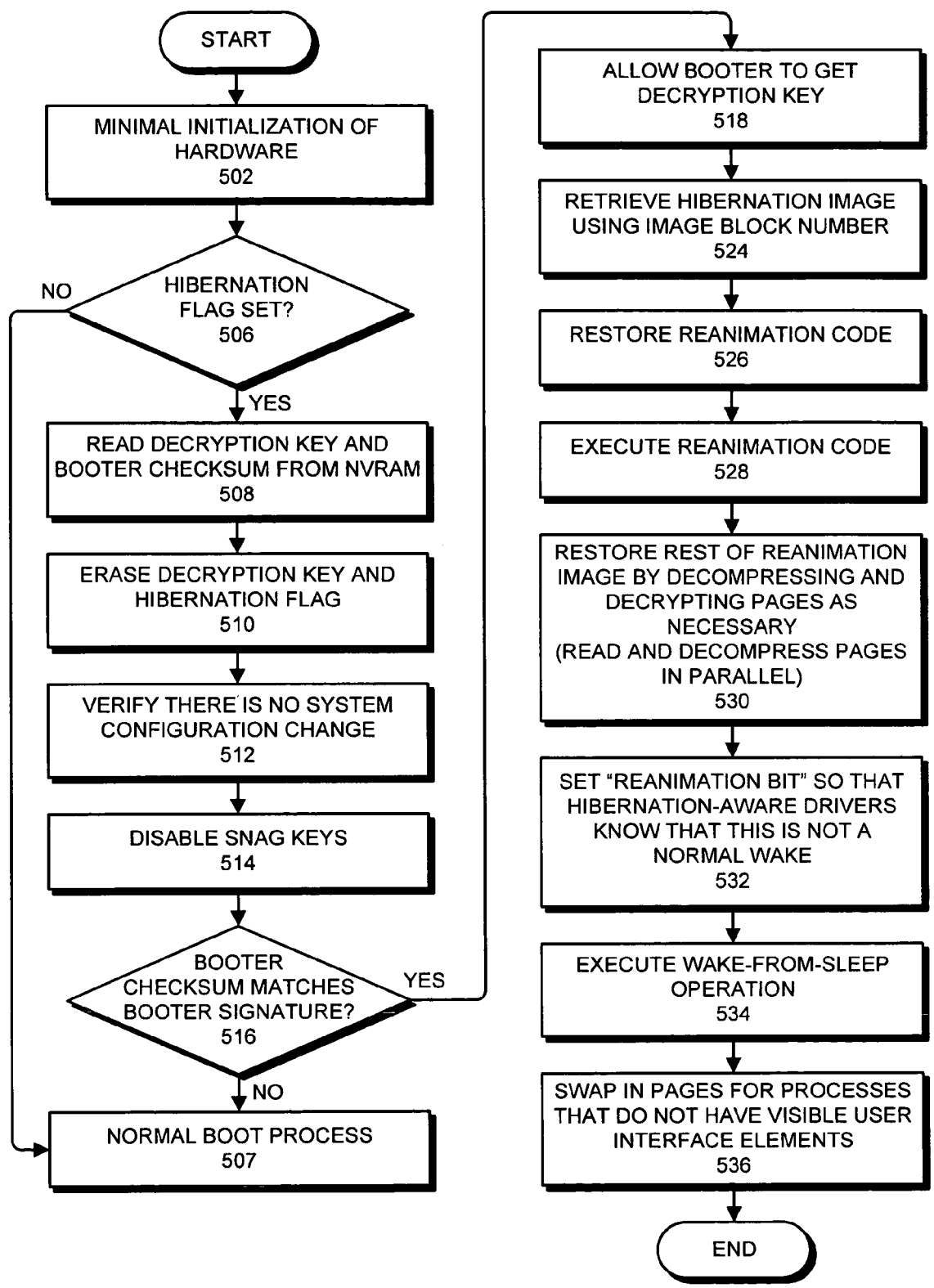
FIG. 5 presents a flow chart illustrating the process of reanimating a computing device from a hibernation image in accordance with an embodiment of the present invention.

FIG. 5 presents a flow chart illustrating the process of reanimating a computing device from a hibernation image in accordance with an embodiment of the present invention. This process starts during a normal boot up operation of computing device 100, which involves executing code from a system Boot Read-Only Memory (ROM) (not illustrated). First, the system performs a minimal initialization of the hardware (step 502). Next, the system checks if the hibernation flag 206 is set (step 506). If not, the system defaults to performing a normal boot operation (step 507).

On the other hand, if hibernation flag 106 is set, the system reads the previously stored decryption key 202 and booter checksum 204 from NVRAM 118 (step 508). The system then erases decryption key 202 and booter checksum 204 from NVRAM 118 (step 510). The system also compares the system configuration against the previously stored system configuration information 210 to verify that the system configuration has not changed since hibernation image 177 was created (step 512). If the configuration has changed, the system can perform a remedial action, such as defaulting to a normal boot operation. On the other hand, if the system configuration has not changed, the system disables "snag keys," which are used to select different boot modes (step 514).

The booter then commences executing a shortened boot path. During this shortened boot path, the system determines if the booter checksum 204 matches the booter checksum of the booter that is presently performing the boot up process (step 516). If not, the system defaults to the normal boot process (step 507). Otherwise, if booter checksum 204 matches the current booter's checksum, the system allows the booter to obtain the decryption key 202 (step 518).

Next, the system retrieves hibernation image 117 from the locations specified by the previously-stored image block number 208 (step 524). The system then restores the reanimation code 302 from hibernation image 117 (step 526), and begins executing reanimation code 302 (step 528).

Reanimation code 302 effectively contains a "mini-kernel" which restores the rest of the state of computing device 100 from hibernation image 117 (step 530). More specifically, this involves reading and decompressing user pages 304 as well as reading, decompressing and decrypting wired pages 306. During this process, the reading operations can take place in parallel with the decompression operations to improve performance. This assumes that multiple buffers exist so that data can be read to a first buffer while data is being decompressed from a second buffer. The system also sets a reanimation flag so that hibernation-aware drivers can determine that this is not a normal wake operation (step 532).

After hibernation image 117 has been restored, the system performs a normal wake-from-sleep operation (step 534) and swaps in processes that do not have visible user interface elements (step 536). Note that the system first reanimates processes with visible user interface elements from the hibernation image to get the computing device reanimated quickly. The system then reanimates processes that do not have visible user interface elements. The above-described system determines which processes to reanimate first by identifying processes with "visible user interface elements." However, other criteria can be used. In general, the present invention determines which processes are "important for user responsiveness." In most cases, these tend to be processes with visible user interface elements. However, they can also be processes without visible user interface elements, which perform functions which facilitate user responsiveness. For example, these processes can include: user-interactive processes reflected in open windows; processes reflected in open, but not minimized windows; and certain underlying processes that are not necessarily user-interactive, but necessary to continue reviving of other programs (such as Apple Finder™).

In one embodiment of the present invention, the system determines which processes to reanimate first by sorting processes based on some measure related to user responsiveness. The system then identifies a set of more-important processes to reanimate first based on the sorted ordering.

Note that the determination of which processes to reanimate first takes place during hibernation. This determination affects how the hibernation image is constructed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for causing a computing device to enter a hibernation mode, comprising:
   creating a hibernation image for the computing device;
   wherein creating the hibernation image involves,
      identifying a first group of processes which will be reanimated prior to additional processes, wherein the first group of processes comprises processes important for user responsiveness, and
      generating the hibernation image so that the first group of processes can be reanimated prior to the additional processes;
   storing the hibernation image in non-volatile storage; and
   causing the computing device to enter the hibernation mode, wherein the active state of the computing device is preserved in non-volatile storage while power to volatile storage is turned off.

2. The method of claim 1, wherein generating the hibernation image involves evicting user pages for the additional processes into swap space in non-volatile storage, so that the user pages do not have to be part of the hibernation image, and can be swapped back in later as needed after the computing device is reanimated.

3. The method of claim 1, wherein generating the hibernation image involves:
   writing kernel pages and user pages for the first group of processes to a first portion of the hibernation image, wherein the first portion of the hibernation image is reanimated first;
   writing pages for the additional processes to a second portion of the hibernation image, wherein the second portion of the hibernation image is reanimated after the first portion; and
   marking operating system structures to ensure that a system pager does not swap out physical pages allocated to the user pages for the additional processes before the user pages for the additional processes can be restored during the reanimation process.

4. The method of claim 1, wherein identifying processes that are important for user responsiveness involves identifying processes with visible user interface elements.

5. The method of claim 1, wherein the additional processes that do not have visible user interface elements can include processes that are associated with an off-screen session.

6. A computer-readable storage medium storing instructions that when executed by a computer cause the computer to perform a method for causing a computing device to enter a hibernation mode, wherein the method comprises:
   creating a hibernation image for the computing device;
   wherein creating the hibernation image involves,
      identifying a first group of processes which will be reanimated prior to additional processes, wherein the first group of processes comprises processes important for user responsiveness, and
      generating the hibernation image so that the first group of processes can be reanimated prior to the additional processes;
   storing the hibernation image in non-volatile storage; and
   causing the computing device to enter the hibernation mode, wherein the active state of the computing device is preserved in non-volatile storage while power to volatile storage is turned off.

7. The computer-readable storage medium of claim 6, wherein generating the hibernation image involves evicting user pages for the additional processes into swap space in non-volatile storage, so that the user pages do not have to be part of the hibernation image, and can be swapped back in later as needed after the computing device is reanimated.

8. The computer-readable storage medium of claim 6, wherein generating the hibernation image involves:
   writing kernel pages and user pages for the first group of processes to a first portion of the hibernation image, wherein the first portion of the hibernation image is reanimated first;
   writing pages for the additional processes to a second portion of the hibernation image, wherein the second portion of the hibernation image is reanimated after the first portion; and
   marking operating system structures to ensure that a system pager does not swap out physical pages allocated to the user pages for the additional processes before the user pages for the additional processes can be restored during the reanimation process.

9. The computer-readable storage medium of claim 6, wherein identifying processes that are important for user responsiveness involves identifying processes with visible user interface elements.

10. The computer-readable storage medium of claim 6, wherein the additional processes that do not have visible user interface elements can include processes that are associated with an off-screen session.

11. An apparatus that causes a computing device to enter a hibernation mode, comprising
   a hibernation mechanism;
      wherein the hibernation mechanism is configured to create a hibernation image for the computing device by,
         identifying a first group of processes which will be reanimated prior to additional processes, wherein the first group of processes comprises processes important for user responsiveness, and
         generating the hibernation image so that the first group of processes can be reanimated prior to the additional processes; and
      wherein the hibernation mechanism is configured to store the hibernation image in non-volatile storage; and
      wherein the hibernation mechanism is configured to cause the computing device to enter the hibernation mode, wherein the active state of the computing device is preserved in non-volatile storage while power to volatile storage is turned off.

12. The apparatus of claim 11, wherein the apparatus further comprises:
a reanimation mechanism configured to reanimate the computing device by:
reanimating the first group of processes to get the computing device reanimated quickly; and then
reanimating the additional processes.

13. The apparatus of claim 11, wherein while generating the hibernation image, the hibernation mechanism is configured to evict user pages for the additional processes into swap space in non-volatile storage, so that the user pages do not have to be part of the hibernation image, and can be swapped back in later as needed after the computing device is reanimated.

14. The apparatus of claim 11, wherein while generating the hibernation image, the hibernation mechanism is configured to:
write kernel pages and user pages for the first group of processes to a first portion of the hibernation image, wherein the first portion of the hibernation image is reanimated first;
write pages for the additional processes to a second portion of the hibernation image, wherein the second portion of the hibernation image is reanimated after the first portion; and to
mark operating system structures to ensure that a system pager does not swap out physical pages allocated to the user pages for the additional processes before the user pages for the additional processes can be restored during the reanimation process.

15. The apparatus of claim 11, wherein while identifying processes that are important for user responsiveness, the hibernation mechanism is configured to identify processes with visible user interface elements.

16. The apparatus of claim 11, wherein the additional processes that do not have visible user interface elements can include processes that are associated with an off-screen session.

17. A method for causing a computing device to enter a hibernation mode, comprising:
creating state information for reanimating the computing device;
wherein creating the state information involves,
identifying a first group of processes which will be reanimated prior to additional processes, wherein the first group of processes comprises processes important for user responsiveness, and
generating the state information so that the first group of processes can be reanimated prior to the additional processes; and
storing the state information in non-volatile storage; and
causing the computing device to enter the hibernation mode, wherein the state information is preserved in non-volatile storage while power to volatile storage is turned off.

18. A computer-readable storage medium, wherein the computer-readable storage medium contains:
a hibernation instruction, which causes the computer to,
create a hibernation image for the computing device, wherein creating the hibernation image involves, identifying a first group of processes which will be reanimated prior to additional processes, wherein the first group of processes comprises processes important for user responsiveness, and generating the hibernation image so that the first group of processes can be reanimated prior to the additional processes,
store the hibernation image in non-volatile storage, and to
cause the computing device to enter the hibernation mode, wherein the active state of the computing device is preserved in non-volatile storage while power to volatile storage is turned off.

19. A method for reanimating a computing device for a hibernation mode, comprising:
reanimating a first group of processes from state information stored in non-volatile storage to get the computing device reanimated quickly, wherein the first group of processes comprises processes important for user responsiveness; and
subsequently reanimating additional processes.

20. The method of claim 19, wherein the first group of processes includes processes which are associated with visible user interface elements.

* * * * *